United States Patent

Starkey

[11] Patent Number: 5,154,284
[45] Date of Patent: Oct. 13, 1992

[54] COMPACT DISC PACKAGING

[76] Inventor: Merrily J. Starkey, R.R. 1, Box 300, Drifting Dr., Hellertown, Pa. 18055

[21] Appl. No.: 788,880
[22] Filed: Nov. 7, 1991
[51] Int. Cl.⁵ ............................................. B65D 85/30
[52] U.S. Cl. ................................. 206/311; 206/313; 206/444
[58] Field of Search ............... 206/444 X, 313 X, 312, 206/311, 309, 310, 307, 466

[56] References Cited

U.S. PATENT DOCUMENTS

| | | | |
|---|---|---|---|
| 2,333,798 | 11/1943 | Kner | 206/312 X |
| 3,717,297 | 2/1973 | Perry | 206/312 X |
| 4,200,189 | 4/1980 | Hagelberg | 206/313 |
| 4,653,639 | 3/1987 | Traynor | 206/312 X |
| 4,730,727 | 3/1988 | Petroff | 206/311 |
| 4,895,252 | 1/1990 | Nomula et al. | 206/312 X |
| 4,971,195 | 11/1990 | Mitsuyama | 206/313 X |
| 5,048,681 | 9/1991 | Henkel | 206/313 X |

Primary Examiner—Jimmy G. Foster
Assistant Examiner—Jacob K. Ackun, Jr.
Attorney, Agent, or Firm—Gregory J. Gore

[57] ABSTRACT

A compact disc package is constructed like a cover-fold matchbook. A sleeve which holds the optical disc is located in a double-fold, matchbook-type cover. The double-fold creates a two-part cover, an outer cover, and an internal segment which contains the sleeve. The sleeve is secure when the packaging is closed by inserting both the sleeve and the cover under the flap. Visual materials are printed on a single large sheet which is folded and highly compressed. The folded printed matter is secured within the package between the bottom flap and rear cover.

10 Claims, 2 Drawing Sheets

COMPACT DISC PACKAGING

FIELD OF THE INVENTION

This invention relates to packaging for audio and/or video discs. More particularly, it relates to a convenient miniature pocket-size packaging system which holds both the disc of recorded material and supplementary information.

BACKGROUND OF THE INVENTION AND PRIOR ART

Prerecorded optical audio discs, commonly referred to as "CD's", are in common use. The standard size 5" discs record optically readable imprinted information and are used widely for musical recordings. Heretofore, the usual packaging has included a cardboard box approximately 11½"×6" which holds a smaller, rigid plastic case (5"×5½") that contains the CD. The CD case is made of a heavy plastic material and it is known to include explanatory printed matter in the same packaging with the disc.

The diameter of the prerecorded optical discs are becoming smaller and, therefore, may lend themselves to different and more easy to handle packaging than rigid plastic boxes. Audio discs are available which are only 3" in diameter, and new audio discs will soon be available even smaller in the near future. These pocket-size discs will require new packaging designs in order that they can be easily handled and protected when not in use. A further desire is to have a packaging system that will not only hold the optical disc, but will also contain printed information about the musical recording, the artist, and other promotional material. It is a further objective that optical disc packaging be as ecologically safe as possible.

The closest prior art pertinent to the applicant's invention of which he is aware includes U.S. Pat. No. 4,819,799 issued to Nomula et al, U.S. Pat. No. 4,606,553 issued to Nickerson, U.S. Pat. No. 4,694,954 issued to Moss, and U.S. Pat. No. 5,048,681 issued to Henkel. No prior art teaches or suggests the novel and unobvious features of the present invention.

SUMMARY OF THE INVENTION

In order to meet these needs in the CD packaging art, the present packaging system has been devised which is constructed like a cover-fold matchbook. Using this configuration, the applicant has achieved a convenient, easy-to-handle, and ecologically safe new packaging method for optical discs. This packaging design, which will be further described herein, permits the construction to utilize heavy weight paper, rather than rigid plastic. It utilizes a novel matchbook-type package folding which secures both the optical disc and supplemental information in an appealing and convenient manner.

A sleeve which holds the optical disc is located within a double fold of the matchbook "cover". The double fold creates a two-part cover, an outer cover and an internal segment which contains the sleeve. The sleeve is secured when the packaging is closed by inserting both the sleeve and cover under a bottom flap. Visual materials are printed on a single large sheet which is folded by a system which permits the sheet to be highly compressed into a small space and convenient to open. The folded printed matter is secured within the package between the bottom flap and the rear cover. This novel packaging design may also be constructed entirely out of paper products which are fully recyclable and, therefore, considered much more ecologically safe than the rigid plastic packaging materials of the prior art.

More specifically, the applicant has devised an optical disc matchbook-type package, comprising a front cover and a back cover separated by a first fold and made of a single continuous piece of material, the back cover including an extension thereof at the bottom creating a flap which is folded forward to receive the lower lip of the front cover when the package is closed; and, the front cover including a second fold which lies between outside and inside segments, said inside segment containing a sleeve for holding a circular prerecorded disc. The disc is held within the sleeve, and further includes a horizontal opening which is closed by the second fold when the packaging is in its closed condition, said sleeve opening facing toward the flap when the package is fully opened.

DESCRIPTION OF THE PREFERRED EMBODIMENT

Figure 1:
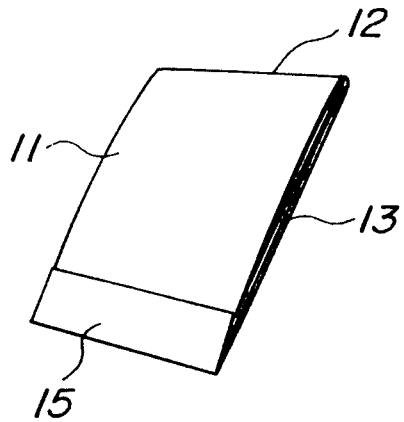
FIGS. 1-8 show the sequence of opening the packaging of the present invention, which permits the disc to be easily removed and the accompanying supplementary information to be unfolded and viewed.

Referring now to FIG. 1, the present CD packaging is shown in its closed condition, having the appearance of a cover-fold matchbook. Front cover 11 and opposing rear cover 13 are separated by top fold line 12. Bottom flap 15 secures the lower lip of the front cover 11 when the package is closed.

Figure 2:
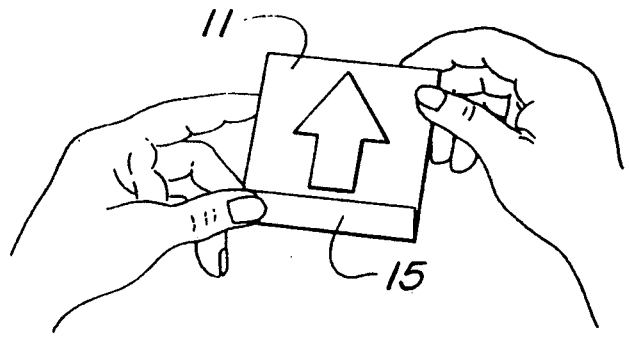
Figure 3:
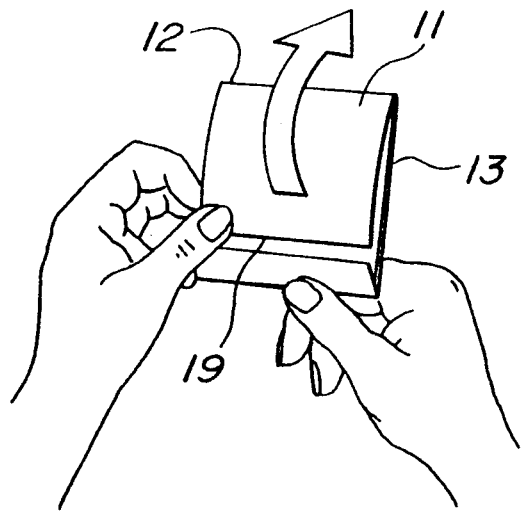
Figure 4:
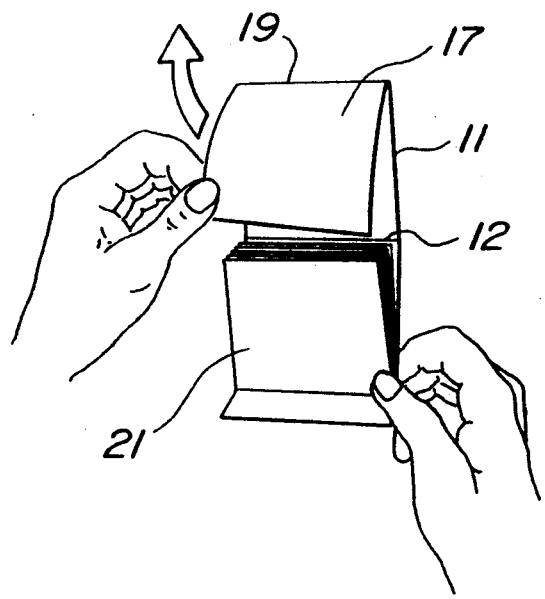

FIGS. 2, 3 and 4 show the opening sequence of the packaging. Front cover 11 is lifted up from behind bottom flap 15 so that the lower lip 19 may be withdrawn. As shown in FIG. 4, edge 19 is also a fold line between an additional segment 17 and the front cover portion 11. The front cover section 11 therefore contains two folds 12 and 19 at its top and its bottom respectively. As seen in FIG. 4, the opening of cover 11 reveals folded printed matter 21 underneath.

Figure 5:
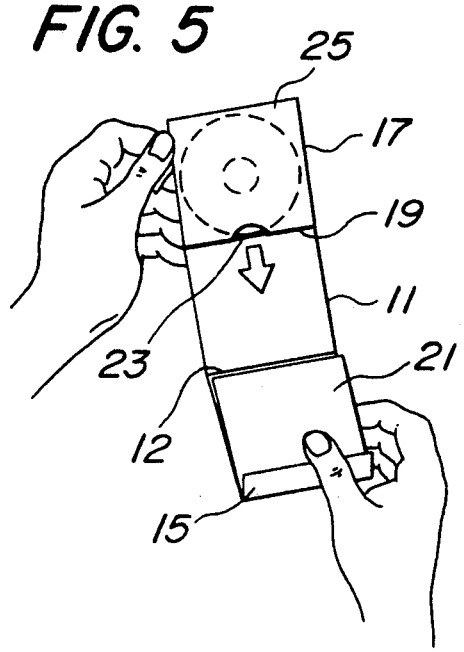

Referring now to FIG. 5, the location and containment of the recorded disc 23 is shown. The extended portion 17 of cover 11 which begins at fold line 19 includes a notched pouch-like sleeve which is created by cover sheet 25. Sheet 25 may be a further extension of the cover material. The sleeve may be easily formed by folding over the top edge and securing the sides with an adhesive. The notching provides easy access for grasping and removal of the CD disc from the sleeve. As clearly seen in FIG. 5, when the cover of the packaging is completely unfolded, the sleeve has an opening at its bottom permitting the easy removal of the disc aided by the downward force of gravity. When the package is closed, the sleeve opening is trapped closed by fold 19 and the CD in the sleeve is held securely within the package between the front and rear covers.

Figure 6:
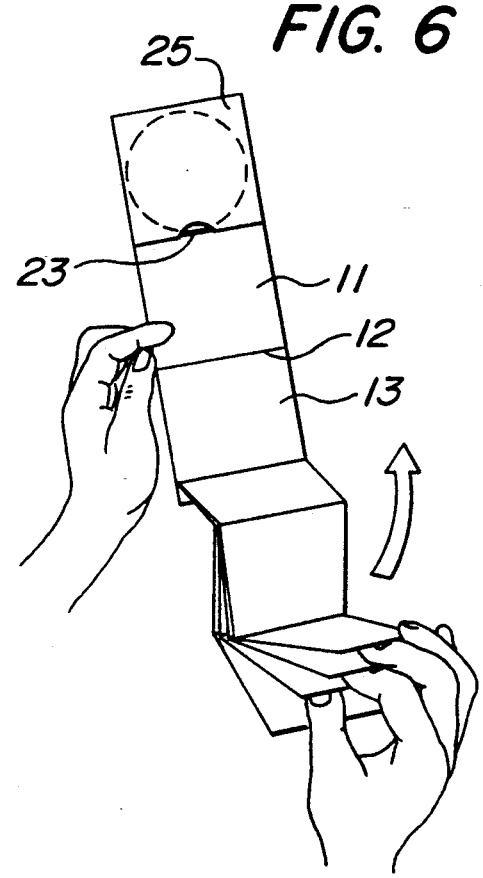
Figure 7:
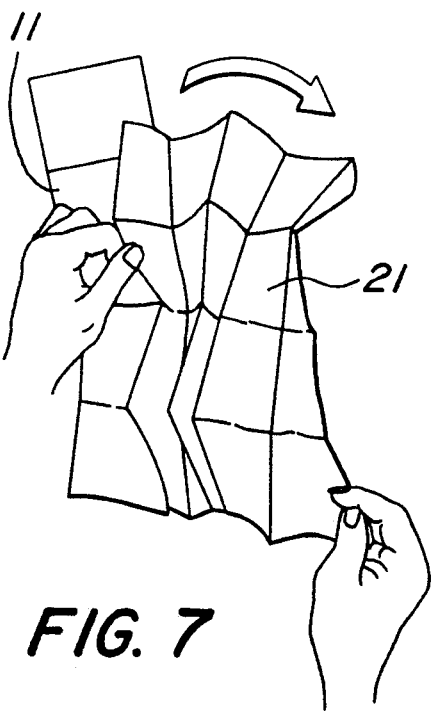
Figure 8:
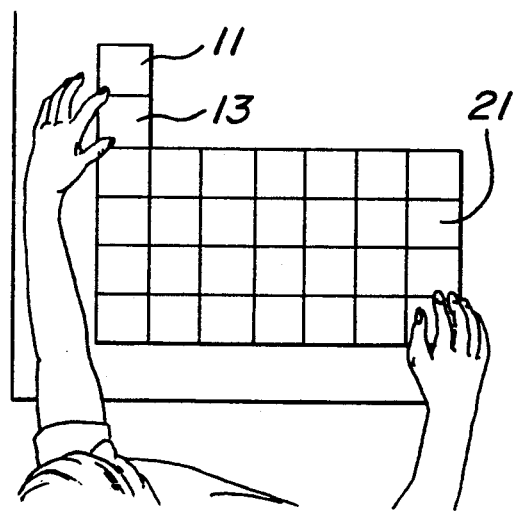

FIGS. 6, 7 and 8 show the sequence of unfolding the supplemental printed matter 21 which may be included in the disc packaging. As shown in these figures, the printed material unfolds by a vertical 'W' fold, and then a horizontal accordion fold to reveal a single, flat sheet of printed material in its final unfolded condition as shown in FIG. 8. The particular folding structure and sequence shown in these drawings permits printed material to be extremely compact in its folded state. For example, a sheet 22¾" wide by 12" high may be compacted to a folded dimension of 3¼" wide by 3" high by 1/16" deep.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A matchbook-type package for a pre-recorded disc, comprising:
   a front cover and an opposing back cover made of a single continuous piece of material separated by a first fold, said back cover including an extension thereof creating a bottom flap which is folded forward and receives the lower lip of the front cover between the flap and the back cover when the package is closed;
   a second fold in the front cover which forms said lip, said second fold bordering a folded portion of the front cover having an internal sleeve, said sleeve lying between said front and rear covers and being closed when said package is closed; and
   a circular pre-recorded disc removably retained within said sleeve.

2. The package of claim 1 wherein said prerecorded disc is an optical disc having a diameter of 3" or less.

3. The package of claim 1 further including a single folded sheet of visual printed information which is permanently secured to the package between the bottom flap and the rear cover.

4. The package of claim 1 wherein said sleeve includes a horizontal opening which is closed by said second fold when the package is in its closed condition, said opening facing downward toward the flap when the package is fully opened.

5. The package of claim 4 wherein the external dimensions of the package are approximately 3½"×3½"×¼".

6. The package of claim 1 wherein the materials of the package are all paper products.

7. The package of claim 6 wherein said sleeve includes a notched cover sheet to facilitate removal of the disc from the sleeve.

8. A matchbook-type package for a pre-recorded disc, comprising:
   a front cover and an opposing rear cover separated by a top fold line;
   an additional segment of said front cover separated from an outer portion of said front cover by a second fold line which forms a lower lip when folded;
   an extension of the rear cover folded forward to create a bottom flap, said bottom flap receiving said lower lip when the package is closed; and
   a notched pouch-like sleeve within said additional segment which begins at the second fold line, said sleeve having an opening at its bottom when the front cover of the package is completely unfolded.

9. A matchbook-type package for a pre-recorded disc, comprising:
   a front cover and an opposing back cover made of a single continuous piece of material separated by a first fold, said back cover including an extension thereof creating a bottom flap which is folded forward and receives the lower lip of the front cover between the flap and the back cover when the package is closed;
   a second fold in said front cover at said lip which lies between and defines outside and inside segments of said front cover, said inside segment having a sleeve; and
   a disc held removably within said sleeve.

10. The package of claim 9, wherein said sleeve further includes a horizontal opening which is closed by the second fold when the package is in its closed condition, said sleeve opening facing downward toward the flap when the front cover is completely unfolded.

* * * * *